April 1, 1969   R. W. WALLACE   3,436,534
ANALOG COMPUTER SYSTEM FOR SOLVING HEAT FLOW PROBLEMS
Filed April 10, 1964   Sheet 1 of 2

INVENTOR
RICHARD W. WALLACE
BY
William C. Wealon
ATTORNEY

United States Patent Office 3,436,534
Patented Apr. 1, 1969

3,436,534
ANALOG COMPUTER SYSTEM FOR SOLVING HEAT FLOW PROBLEMS
Richard W. Wallace, Pittsburgh, Pa., assignor to Dresser Industries, Inc., a corporation of Delaware
Filed Apr. 10, 1964, Ser. No. 358,729
Int. Cl. G06g 7/56
U.S. Cl. 235—185                                              3 Claims

ABSTRACT OF THE DISCLOSURE

An analog computer for solving heat flow problems through a refractory structure in which adjustable resistance means are connected in series. The value of current flow through the resistance is the analog of heat flow. There is a constant voltage applied to the system and there is readout means directly readable in temperatures, for example, for the cold face of the structure.

---

To properly design the refractory walls and crowns for metallurgical furnaces, vessels and the like, steady-state calculations of the heat losses and the cold face and interface temperatures (when the wall is multi-layered) must be made. Such calculations enable one to predict what is the proper selection of refractory insulation and backup for hot face refractory, as well as enabling one to determine the thermal efficiency of an operation. As is well known to those skilled in the art, for single or double layer or component walls, the calculation, though based on trial or error procedures, is not too time consuming. However, the more strata of refractory from hot face to cold face, the more tedious and time consuming calculations for design become. In fact, the calculations probably leave the realm of the ordinary skilled engineer and enter the bailiwick of the skilled mathematician or physicist. The situation is more complex with such multi-component systems, because the mean temperatures of refractory strata or components must be first estimated and then corrected, as the hunt and seek calculation system proceeds.

The analogy between heat flow and electrical current flow has been recognized previous to this invention. In more recent times, heat transfer problems have been solved with digital computers, which are capable of solving complex transient systems.

The analogy, which allows electrical simulation of heat flow problems, stems from the correlation between the Fourier heat transfer equation and Ohm's law for direct current flow. For a steady-state condition, assuming thermal conductivity is a linear function of temperature, the Fourier equation can be expressed as follows:

(1) $$Q_A = \frac{K}{X}(T_H - T_C)$$

$Q_A$ is heat flow per unit area per unit time, B.t.u./ft.$^2$ hr., K is thermal conductivity in B.t.u./ft.$^2$ hr. °F./in., X is thickness in direction of heat flow in inches, $T_H$ is hot face temperature in °F., and $T_C$ is cold face temperature in °F.

Rearranging the values of the foregoing equation and comparing with Ohm's law (3), we can see the related quantities:

(2) $$T_H - T_C = Q_A \frac{X}{K}$$

(3) $$V_H - V_C = IR$$

Heat flow per unit area Q is analogous to current flow I; temperature T is analogous to voltage V; and resistance R is analogous to the ratio of thickness X to heat conductivity K.

The ratio of the thickness to the thermal conductivity X/K can be referred to as a thermal resistance. When the heat conduction is through a refractory structure comprising a plurality of strata, then the thermal resistances of the individual strata must be summed to get the thermal resistance of the structure. Accordingly, Equation 2 becomes:

(4) $$T_H - T_C = Q_A \sum_{i=1}^{i=n} \left(\frac{X}{K}\right)_i$$

The electrical analogue of a refractory structure comprising a plurality of strata is a plurality of resistors connected in series and the electrical equation corresponding to Equation 4 is (5) $$V_H - V_C = I \sum_{i=1}^{i=n} R_i$$

The exposed cold face loses heat through radiation and convection. The heat loss, which will be equal to the heat flow through the structure can be expressed as follows:

(6) $$Q_B = \sigma\epsilon(T_C^4 - T_A^4),$$

and (7) $$Q_C = f_1(T_C - T_A)$$

$\sigma$ is the Stefan-Bolsman constant, $\epsilon$ is emittance of the surface (experimentally determined), $T_C$ is cold face temperature, and $T_A$ is ambient temperature. $Q_B$ is heat loss due to radiation and $Q_C$ is heat loss through connection. The foregoing Equations 1, 6 and 7 can be expressed as follows:

(8) $$Q_A = Q_B + Q_C$$

The invention, thus, enables the rapid simultaneous solution of Equations 1, 6 and 7.

Accordingly, it is an object of this invention to provide an analog system of a direct readout type for automatic determination and prediction of interface and cold face temperatures of multi-component (and single component, if desired) refractory structures. It is another object of the invention to provide method and apparatus, of the electrical analog type, constructed and arranged for the rapid solution of steady-state heat transfer problems for composite refractory walls. It is another object of this invention to provide method and apparatus for automatically solving steady-state heat transfer problems of multi-component refractory walls (including exterior metal shells, if they are present) of varying surface designs.

Briefly, in a broad aspect, this invention provides apparatus of the electrical analog type for solving heat transfer problems for multi-component refractory structures. The apparatus includes a constant voltage supply or energy source for a series of selectively connectable variable resistors. Direct readout means are provided in the form of a voltmeter and an ammeter for determining, respectively, voltage drop across the series of potentiometers, and current flow therethrough. The ammeter and voltmeter are provided with scales. The ammeter scale is selectively replaceable for direct readout of system heat flow and face temperatures, respectively, of a multi-component system. This series of resistors is, of course, the analog of a series of refractory components to be considered. Each of the resistors is provided with an adjustable direct readout scale, upon which thermal resistance of respective members of the series of refractory can be set or programmed. The resistors can be termed "memory units."

Additional means, in the form of another variable resistor, is provided. The additional variable resistor is arranged for adjustment to control the amount of Q simulated by the analog system flowing from the exterior of the cold face of the multi-component system to ambient surroundings. The scale, which is provided for the ammeter, allows proper adjustment of this latter resistor. The scale is precalibrated to a heat transmission curve, which governs heat losses through radiation and convection from a given body at one temperature to its surroundings at another temperature.

With a given series of contiguous refractory components, the analogous series of resistors, just mentioned, are suitably adjusted and set in fixed positions to reflect expected mean temperatures. The variable resistor interconnected with the ammeter scale (assuming correct predisposition of each of the series of component resistors), results in a reading on the voltmeter scale in ° F. for the exposed or cold surface of the multi-component refractory system being considered.

As noted, the predisposition of each of the series of resistors is, in the first instance, estimated. This estimation is based on the following: Since thermal conductivity K, as explained above, is a function of temperature, an estimation is made of the mean temperature of each of the refractory components, and K and, thus, R are evaluated. If the first estimations prove incorrect, new mean temperatures are set and the procedure repeated.

In preferred circuitry, the electrical analog system of this invention may include a null-balance system comprised of an additional series of variable resistors or potentiometers to eliminate error which might result because of the current drawn from the system in energization of the voltmeter.

A better understanding and other objects, features and advantages of this invention will become readily apparent to those skilled in the art from a study of the following detailed description, with reference to the appended drawings. In these drawings.

Before describing the drawings in detail, it should be understood they are but exemplary of one relatively inexpensive and preferred embodiment of the invention, and that other arrangements of electrical components may be arranged to operate within the spirit and scope of this invention.

Figure 1:
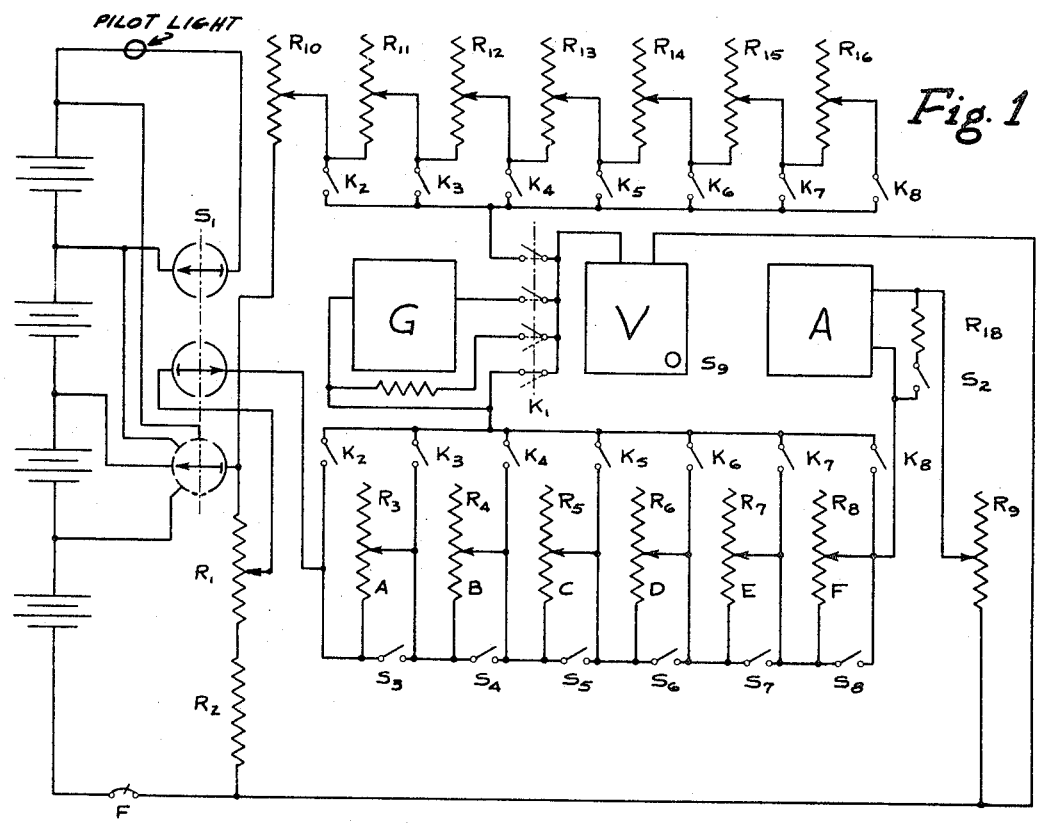
FIG. 1 is a schematic circuit diagram of relatively inexpensive and easily constructed apparatus for the practice of this invention.

In FIG. 1, there is shown, schematically, two aligned series of resistors which are selectively interconnectable with a power source consisting of a selectively interconnectable series of batteries. A gang switch $S_1$ is provided for the selective interconnection of one or more of this series of batteries. A first switch $K_2$, upon closure, interconnects the power or voltage source and the two series of resistors or potentiometers with the interconnected galvanometer G and voltmeter V. A fuse F is included in the power circuit, as are a resistor and a potentiometer $R_2$ and $R_1$, respectively. The voltmeter is provided with a scale which reads in units of temperature so that the temperature simulated by voltages in the analog system can be directly read out from the voltmeter.

In a given situation, knowing the expected hot face temperature in the metallurgical furnace or the like, one knows the temperature of the innermost face or surface of a multi-component system. The potentiometer $R_1$, upon closure of switch $K_2$, is adjusted until one obtains direct readout on the voltmeter scale of the hot face temperature. As easily can be seen, by suitable closure of any or more of the series of switches $S_3$ through $S_8$, and closure of a selected one of the switches $K_3$ through $K_8$, one and more of the resistors $R_3$ through $R_8$ and $R_{10}$ through $R_{16}$ can be placed in the circuit between the power source and the ammeter A. (The same series of reference characters, $K_2$ through $K_8$ are shown adjacent the series of resistors $R_{10}$–$R_{16}$ and potentiometers $R_3$–$R_8$ for simplicity of explanation. Actually, the switches of each pair, for example, switch $K_2$ associated with resistor $R_{10}$ and switch $K_2$ associated with potentiometer $R_3$, are ganged to be operated by the same toggle actuator.) In a properly arranged combination of resistors $R_3$ through $R_8$ (This will be better understood by reference to the specific examples set forth hereafter.), one can now directly readout an expected cold face temperature after manipulation or adjustment of the variable resistor $R_9$ (There is an instrument adjustment, however, before this step is carried out, which will be better understood hereafter.).

Figure 3:
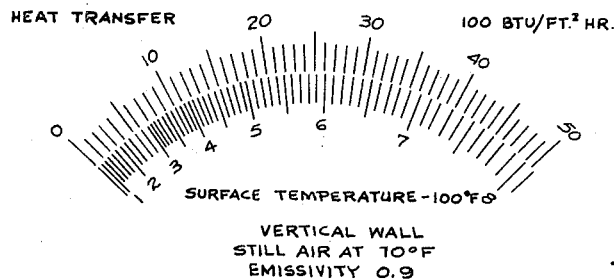
FIG. 3 is an exemplary ammeter scale.
Figure 4:
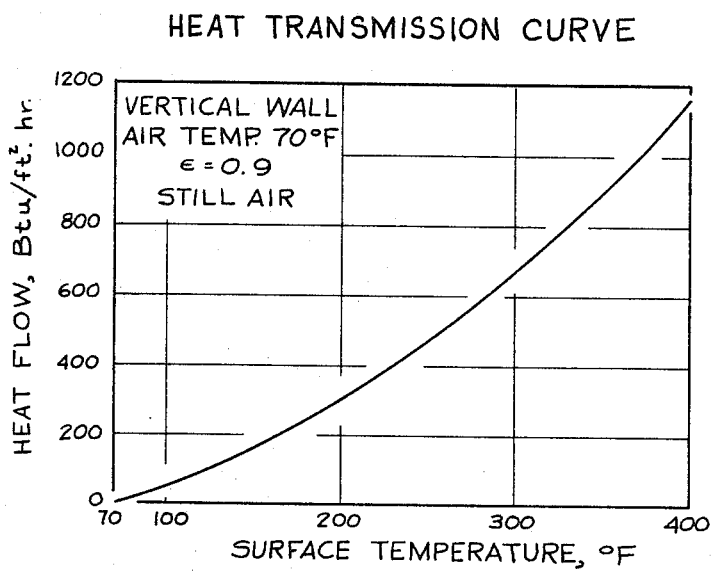
FIG. 4 is an exemplary heat transmission curve, from which to calibrate the scale of FIG. 3.
Figure 5:
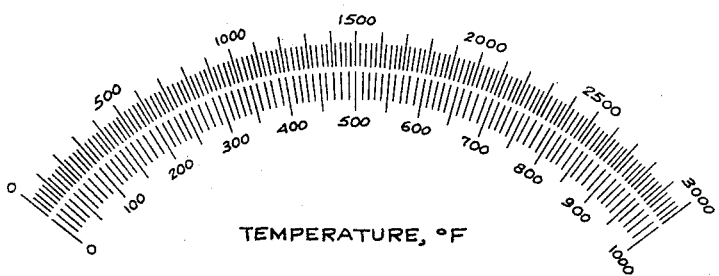
FIG. 5 is an exemplary voltmeter scale.

The ammeter A measures the current flow simulating the amount of heat flow through plural wall components. The heat flow correlates with the cold face temperature for a given set of ambient conditions and the dial of the ammeter is in units of temperature calibrated to indicate the cold face temperature for a predetermined set of ambient conditions. For example, assume a vertical cold face wall, an ambient air temperature in still air, on the order of 70° F., and emissivity of about 0.9. The ammeter scale is as shown in FIG. 3. In the same system, the voltmeter scale is as shown in FIG. 5. Temperature readings are balanced as read on the scale of voltmeter V with temperature as read on the scale of ammeter A, by adjusting the resistor $R_9$. Stated another way, the resistor $R_9$ is varied to make the cold face temperature as read by the voltmeter V equal to the cold face temperature as read by the ammeter A. Making the example more specific, assume a hot face temperature of 3000° F. One predetermines the number of strata or layers of refractory that is wished between the hot face and the cold face. Estimate the mean temperature of each of the strata. For example, assuming a four strata or layer system with a hot face temperature of about 3000° F., one estimates interface temperatures between the four components. Assuming the first interface to be 2000° F., the second 1500° F. and the third 1000° F., one arrives at mean temperatures for the four units of 2500° F., 1750° F., 1375° F. and 500° F. One also knows the thickness of these four strata. Therefore, one finds the ratio of thickness to thermal conductivity and calculates an R factor or thermal resistance. Assuming an element A of thickness X and thermal conductivity K, R is calculated as follows:

(9) $$R_A = X_A / K_A$$

The resistances $R_3$ through $R_8$ are provided with scales A–F which vary with the values of the resistors and directly provide indications of the thermal resistances represented by the values of the resistors. The four values, thus calculated, are set on the scales A, B, C, and D associated with the first four resistances, $R_3$, $R_4$, $R_5$, and $R_6$. Switches $S_3$, $S_4$, $S_5$ and $S_6$ are opened. Switch $K_6$ is closed. The voltmeter V is connected to measure the voltage across the ammeter A and the resistor $R_9$ and thus indicate the simulated cold face temperature. Assuming switch $S_1$ is properly positioned to supply the required voltage, switch $S_9$ is used to adjust the voltmeter scale, if necessary; and potentiometer $R_9$ is adjusted to obtain identical readout of temperature on the scales of the voltmeter F and ammeter A. (Switch $S_2$ is for purposes of changing scale on the ammeter; and this switch is closed, if necessary.) The ammeter scale will now directly readout the cold face temperature of the selected system.

As noted previously, in the circuit shown in FIG. 1, including the series of variable resistors to simulate multi-component walls, some current must be drawn to energize the voltmeter. This produces a relatively small current error, but it may effect scale reading of face temperature appreciably, for example, as much as 10%. The accuracy is improved by the interconnection of the series of variable resistors $R_{10}$ through $R_{16}$ inclusive. Note that the same switches, $K_2$ through $K_8$, interconnect complementarily positioned resistors $R_{11}$ through $R_{16}$ and resistors $R_3$ through $R_8$. By switching in the galvanometer G at each point of measurement by closing the switch $K_1$, measurement of the variable resistors can be so adjusted as to nullify the inaccuracy, just noted, and assure that virtually no current is drawn from the various wall component resistors. Thus, the voltage drop across the voltmeter is equal to the voltage drop across the wall components in question and, thus, null-balance measurement is obtained. The circuitry may be used without the null-balance feature, by leaving the switch $K_1$ in an open position. However, this is not recommended when accuracy is essential.

Figure 2:
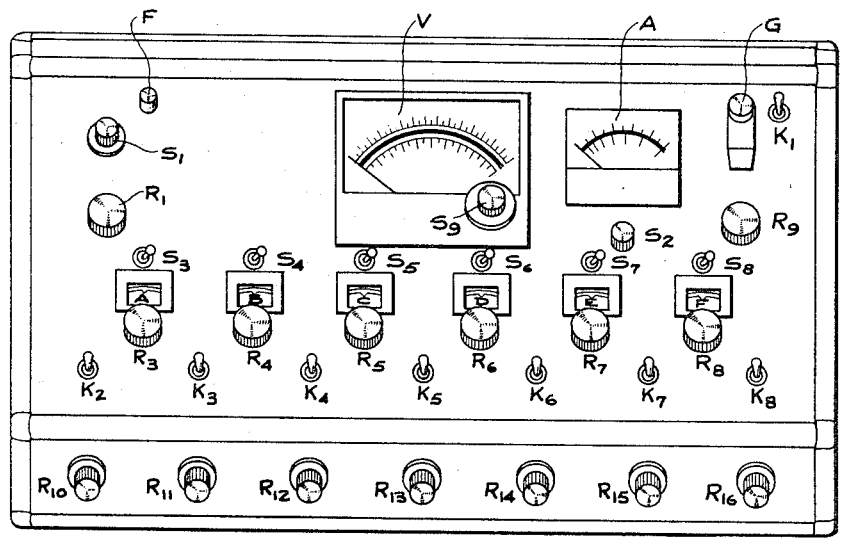
FIG. 2 is a perspective view of an instrument embodying the circuitry of FIG. 1.

Referring, for the moment, to FIG. 2, the knobs labeled $R_{10}$ through $R_{16}$ correspond to similarly labeled resistors. Switches $K_2$ through $K_8$, in FIG. 5, correspond to similarly labeled parts in the similar diagram of FIG. 1. Switches $S_3$ through $S_8$ similarly correspond, as do other parts of identical reference character designation. Scales A through F are interconnected with the indicated resistors.

A more detailed and typical problem in furnace design may be solved by the foregoing arrangement, as follows: Given a wall thickness of a multi-component wall of particular materials, the hot face temperature and thermal conductivities for these materials are known. It is desired to determine the heat flow, the cold face temperature and the interface temperatures at a steady-state condition. To solve this problem with my electrical analog system, one begins by choosing an approximate mean temperature for each wall component. Having done this, one then notes the thermal conductivities to be used. These conductivities are then divided into the thickness of each component and individually placed on the wall resistor dials, A through F, in order. The hot face temperature is then applied in terms of voltage, by adusting the variable potentiometer $R_1$, until the voltmeter reads the correct potential, as expressed in °F. The voltmeter is then switched away from the hot face and to the cold face, whereupon the heat loss resistor $R_9$ is adusted until proper balance is obtained between the ammeter and voltmeter scales. This will satisfy first calculations.

A step by step outline of exemplary problems which can be solved by using my invention are as follows:

FOR FLAT WALL CALCULATIONS

A. Given $T_H$, X's and K functions, find $T_C$ and $Q_A$ (1) First estimate means temperatures and determine K values for each component.

(2) Divide the K values into the corresponding thickness for each component to determine R factors. Hold decimal place.

(3) Determine the wall dials to be used, and set the appropriate R values on each dial. (In preferred form, the dials A, B and C are lower in range than D, E and F. This is to allow more accurate setting of high conductivity components. Thus, R factors under 1.00 should be set on dials A, B or C; R factors over 1.00 should be set on dials D, E or F. Note that it is possible to split the R factors and put part on each dial, provided the total R is equal to the sum of the R's on each dial.) Turn off the switches, $S_3$ to $S_8$, corresponding to the R dials used. Turn on (close) all other switches of the series $S_3$ to $S_8$. The selected ones of the resistors $R_3$ through $R_8$, in which values simulating thermal resistances have been set, will then be connected in series with the ammeter A and the resistor $R_9$.

(4) Turn switch $S_1$ to the appropriate stop making sure keys corresponding to switches $K_1$ through $K_8$ are up or open.

(5) Turn switch $S_9$ to the correct range and close switch $K_2$. The selected voltage source will then be applied across the series circuit of the selected ones of the resistors $R_3$ through $R_8$, the ammeter and the resistor $R_9$. The voltmeter will be connected to read the voltage across the series circuit and thus indicate the simulated hot face temperature.

(6) Set the hot face temperature with resistor $R_1$. The voltmeter will measure the voltage drop across the ammeter and the resistor $R_9$ and thus will indicate the simulated cold face temperature when one opens switch $K_2$ as set forth in step 7.

(7) Adjust the value of resistor $R_1$ until the hot face temperature as indicated by the voltmeter is at the value specified by the problem. Open switch $K_2$, and close switch $K_8$; change switch $S_9$ to low range, if possible.

(8) Balance temperature as read on the voltmeter V with temperature as read on the ammeter A by adjusting resistor $R_9$. Switch $S_2$ is set for the dial face of ammeter A. If Q is in the wrong range, one may change the position of switch $S_2$.

(9) Open switch $K_8$, switch the voltmeter range, if necessary, with switch $S_9$. Close the switch $K_2$ to again connect voltmeter V to read hot face temperature $T_H$ and trim $T_H$ as indicated by the voltmeter by varying resistor $R_1$, if necessary. Recheck $T_C$ if much change is made. This procedure is necessary when the battery power supply is not a constant voltage source. If a constant voltage source is used, it is not necessary.

(10) Read the interface temperatures with voltmeter V by closing switches $K_3$–$K_7$, successively to correspond with recalculated thermal resistances. As pointed out above, the values of K and therefore the values of thermal resistances will vary with temperature so the values of the resistors $R_3$ through $R_8$ must be reset when it is found that the interface temperatures as read by the voltmeter do not correspond with the estimated values from which the initial values of thermal resistance were set on the resistors $R_3$ through $R_8$. Null-balance readings are made by closing switches $K_3$–$K_7$, successively to correspond with $K_3$–$K_{11}$, $K_4$–$K_{12}$, etc. to achieve a null on the galvanometer G. When balance is approached, $K_1$ may be depressed momentarily to maximum sensitivity to obtain a close balance.

(11) On the basis of the readings, mean temperatures may be checked and R values corrected. The procedure from 5 to 11 is then repeated one or two times until the desired accuracy is achieved.

B. Given $T_H$, K, and $T_C$ or Q. Find X.

This problem is one that is encountered quite often and can be solved readily on the analog calculator.

It should be recognized that for a particular suface-ambient condition the stipulation of $T_C$ is equivalent to the stipulation of Q, or vice-versa. The procedure, then, is as follows:

(1) Turn off all but two dials, for example, those associated with resistors $R_5$ and $R_8$. Set eamh dial about mid-scale.

(2) Apply $T_H$ as previously explained.

(3) Balance $T_C$ readings on the voltmeter V and the ammeter A with resistors $R_9$.

(4) If $T_C$ is lower than stated, reduce the value of resistor $R_8$ until required $T_C$ is read on ammeter A. Rebalance $T_C$ readings on voltmeter V and ammeter A by means of resistor $R_9$ and repeat. If $T_C$ is higher than required, increase resistor $R_8$. This may be done with switch $K_1$ open. The null-balance system may be used on the final check if desired.

(5) The total R can be read from the dials and that value multiplied by the K of the material will give the thickness.

In determining the relationship between the electrical units and the thermal units for the apparatus shown in my drawings and described above, the following scale factors were used: One volt equals 1000° F.; One milliamp equals 1000 B.t.u./sq. ft. hr.; and 1000 ohms equals 1.0 R factor. The R factor, as noted, is the thermal resistance factor which would result if the thickness in inches were divided by the thermal conductivity in units of B.t.u./ft.² hr. °F./ in. The choice of these scale factors was made to achieve a 1:1 relationship between the orders of magnitude of thermal and electrical units. Dials or scales can be prepared for almost any desired conditions besides the ones just noted.

I have, at various points in the foregoing discussion, described the invention in general terms, taking for granted approximate emittance values are known for various surfaces. These values can be found in any of many standard reference tests, such as:

"Heat Transmission," McAdams, 2nd Edition, McGraw-Hill Book Company, Inc., 1942.

"Heat Insulation," Wilkes, 1st Edition, John Wiley & Sons, 1950.

"International Critical Tables Of Numerical Data, Physics, Chemistry & Technology," Washburn, 1st Edition, McGraw-Hill Book Company, Inc., 1929.

"Handbook Of Chemistry & Physics," Hodgman, 42nd Edition, Chemical Rubber Publishing Company, 1960.

Having thus described the invention in detail and with sufficient particularity as to enable those skilled in the art to practice it, what is desired to have protected by Letters Patent is set forth in the following claims:

I claim:

1. A direct readout electrical analog system for determination and prediction of interface and cold face temperatures of multiple strata refractory structures and comprised of, a group of variable resistor analogs of refractory strata wired for selective interconnection of one and more thereof in series, each of the resistors interconnected with means to vary the resistance thereof, there being means interconnected with each of the variable resistors to readout R value according to the relation $R=X/K$ wherein X is the thickness of at least one of the refractory strata, K is the thermal conductivity and R is thermal resistance thereof, switch means for selectively interconnecting one and more of said resistors in series, and a first additional variable resistor and a second additional variable resistor, a source of constant voltage, said first addition variable resistor interconnected between the voltage source and a first of said group of variable resistors to vary the voltage applied by the voltage source to said group of resistors, the applied voltage being the analog of heat input to the hottest face of the strata of refractory, a voltmeter interconnected across the voltage source and the group of resistors to readout hot face temperature before one and more of the group of variable resistors are interconnected therewith, an ammeter wired for selective interconnection in series with one and more of said group of variable resistors to measure current flow through said group of variable resistors, the current flow being the analog of heat flow, said second additional variable resistor interconnected in series with the ammeter, the ammeter being provided with a scale of units in addition to one of the type normally associated therewith, the additional scale being calibrated in units comparable to the units on the scale normally associated with the voltmeter, the scales of comparable units on the voltmeter and ammeter wired to simultaneously indicate the temperature of the coldest face of the multiple refractory strata by adjustment of the second additional variable resistor.

2. An analog system comprised of a selectively interconnectable series of adjustable memory units, each of the memory units interconnected with programming means, switch means for interconnecting one and more of the memory units in series, first variable means interconnected between an energy source of constant magnitude and a first of a series of memory units to vary the level of energy applied from the energy source to the memory units, first readout means interconnected with the energy source and the series of memory units to measure and indicate the level of the energy applied to the memory units, second direct readout means wired for selective interconnection with one and more of the memory units, each of the memory units interconnected to the next member unit so as to reduce energy flow to the next member unit in an aligned interconnected series thereof, said second direct readout means wired to measure rate of energy flow from said memory units and also to indicate energy level after said memory units, second variable means interconnected with said second readout means, said second variable means wired to further restrict energy flow, said second readout means have a first and a dissimilar second scale of units, said first scale of units indicating energy flow, said first readout means having a scale of units similar to the second scale of units on said second readout means, there being an indicator associated with the scales of the first and second readout means to indicate values on their respective scales, said additional variable means arranged to cause identity of reading on the similar scales of said first and second readout means by restriction of energy flow.

3. A direct readout electrical analog system for determination and prediction of interface and cold face temperatures of multiple strata refractory structures and comprised of, a syrup of variable resistor analogs of refractory strata wired for selective interconnection of one and more thereof in series, each of the resistors interconnected with means to vary the resistance thereof, there being a scale interconnected with each of the variable resistors to readout in temperature degrees according to the relation $R=X/K$ wherein X is the thickness of at least one of the refractory strata, K is the thermal conductivity and R is thermal resistance thereof, switch means for selectively interconnecting one and more of said resistors in series, and a first additional variable resistor and a second additional variable resistor, a source of constant voltage, said first addition variable resistor interconnected between the voltage source and a first of said group of variable resistors to vary the voltage applied by the voltage source to said group of resistors, the applied voltage being the analog of heat input to the hottest face of the strata of refractory, a voltmeter interconnected across the voltage source and the group of resistors to readout hot face temperature before one and more of the group of variable resistors are interconnected therewith, an ammeter arranged for selective interconnection in series with one and more of said group of variable resistors to measure current flow through said group of variable resistors, the current flow being the analog of heat flow, said second additional variable resistor interconnected in series with the ammeter, the ammeter being provided with a scale of units, the scale being calibrated in temperature units comparable to temperature units on a scale associated with the voltmeter, the scale of comparable units on the voltmeter and ammeter wired to simultaneously indicate the temperature of the coldest face of the multiple refractory strata by adjustment of the second additional variable resistor.

References Cited

UNITED STATES PATENTS

| | | | |
|---|---|---|---|
| 2,855,145 | 10/1958 | Patterson | 235—184 |
| 2,974,017 | 3/1961 | Morgan | 235—151.3 X |
| 3,247,364 | 4/1966 | El Waziri | 235—151.3 |

MALCOLM A. MORRISON, *Primary Examiner.*

JOSEPH F. RUGGIERO, *Assistant Examiner.*

U.S. Cl. X.R.

235—151.3

U.S. DEPARTMENT OF COMMERCE
PATENT OFFICE
Washington, D.C. 20231

UNITED STATES PATENT OFFICE
CERTIFICATE OF CORRECTION

Patent No. 3,436,534                            April 1, 1

Richard W. Wallace

It is certified that error appears in the above identified patent and that said Letters Patent are hereby corrected as shown below:

Column 8, line 26, "syrup" should read -- group --.

Signed and sealed this 14th day of April 1970.

(SEAL)
Attest:

Edward M. Fletcher, Jr.                    WILLIAM E. SCHUYLER, J1
Attesting Officer                            Commissioner of Patent